(12) United States Patent
Li et al.

(10) Patent No.: US 9,620,980 B2
(45) Date of Patent: Apr. 11, 2017

(54) CHARGING SYSTEM, CHARGING CONTROL DEVICE AND CHARGING METHOD

(71) Applicant: GLOBALFOUNDRIES INC., Grand Cayman (KY)

(72) Inventors: Li Li, Beijing (CN); Liang Liu, Beijing (CN); Xin Jie Lv, Beijing (CN); Lei Ye, Beijing (CN); Wen Jun Yin, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 239 days.

(21) Appl. No.: 14/477,641

(22) Filed: Sep. 4, 2014

(65) Prior Publication Data

US 2015/0091527 A1   Apr. 2, 2015

(30) Foreign Application Priority Data

Sep. 29, 2013  (CN) .......................... 2013 1 0455323

(51) Int. Cl.
*H02J 7/00* (2006.01)
*H02J 1/02* (2006.01)

(52) U.S. Cl.
CPC ................ *H02J 7/007* (2013.01); *H02J 1/02* (2013.01); *H02J 7/0021* (2013.01); *H02J 7/0052* (2013.01); *Y02T 10/7055* (2013.01)

(58) Field of Classification Search
CPC ........................................................ H02J 1/02

(Continued)

(56) References Cited

U.S. PATENT DOCUMENTS 6,204,630 B1 *  3/2001  James ..................... H02J 7/022
                                                 320/104
8,330,293 B2    12/2012  Brown et al.
(Continued)

FOREIGN PATENT DOCUMENTS

| CN | 201466764 U | 5/2010 |
| CN | 202353270 U | 7/2012 |
| JP | 2010022141 A | 1/2010 |
| JP | 2013048519 A | 3/2013 |

OTHER PUBLICATIONS

Chinese Office Action for Application No. CN201310455323.5; Dated Apr. 25, 2016.

(Continued)

*Primary Examiner* — Edward Tso
*Assistant Examiner* — Ahmed Omar
(74) *Attorney, Agent, or Firm* — Anthony Canale; Hoffman Warnick LLC (57) ABSTRACT

The present disclosure provides a charging system, charging method, and charging control device. The charging system comprises a charger configured to be coupled to an external power source with its one end; a plurality of secondary batteries configured to be coupled to the charger, respectively; and a control device configured to be coupled to the charger and the plurality of secondary batteries, to control the charger to perform a charging operation on the plurality of secondary battery. According to the present disclosure, the secondary batteries having harmonics with identical frequencies and opposite phases are connected in parallel for charging, to reduce or eliminate the harmonic distortion generated by high order harmonics, and effectively reduce the value of THD.

18 Claims, 8 Drawing Sheets

(58) Field of Classification Search
USPC .......................................................... 320/117
See application file for complete search history.

(56) References Cited

U.S. PATENT DOCUMENTS

| 2010/0244773 | A1 | 9/2010 | Kajouke | |
|---|---|---|---|---|
| 2012/0113700 | A1 | 5/2012 | Kajouke et al. | |
| 2012/0293130 | A1* | 11/2012 | Burstein | H02J 7/0019 320/134 |

OTHER PUBLICATIONS

Maria Isabel Milanes-Montero, Javier Gallardo-Lozano, Enrique Romero-Cadaval, and Eva Gonzalez-Romera, "Hall-Effect based semi-fast AC on-board charging equipment for electric vehicles," Sensors 2011, pp. 9313-9326, ISSN 1424-8220, Sep. 28, 2011.

Dylan Dah-Chuan Lu, "Battery charger with power quality improvement," School of Electrical and Information Engineering, The University of Sydney, Australia, Electrical Generation and Distribution Systems and Power Quality Disturbances, ISBN 978-953-307-329-3, pp. 291-304 Nov. 21, 2011.

Malabika Basu, Kevin Gaughan, and Eugene Coyle, "Harmonic distortion caused by EV battery chargers in the distribution systems network and its remedy," Dublin Institute of Technology Conference Paper, pp. 869-873, Sep. 8, 2004.

Wenhai Yang, Zhanlong Zhang, "Simulation of electric vehicle charging station and harmonic treatment," 2012 International Conference on systems and Informatics, pp. 609-613, May 19-20, 2012.

* cited by examiner

CHARGING SYSTEM, CHARGING CONTROL DEVICE AND CHARGING METHOD

TECHNICAL FIELD

The present disclosure relates to a charging system and a charging method, and more particularly to a system and method for charging a battery pack of an electric vehicle.

BACKGROUND

Along with intensification of the global energy crisis, governments and vehicle companies of various countries have come to realize the main direction of the future development of automobile industry is energy-saving and emission reduction, and electric vehicle (including pure electric vehicle) development will be the best way to solve these two problems.

However, as a key technology of electric vehicles, the technology for charging battery pack still has problems existing therein now. For example, a charger for charging an electric vehicle is a typical nonlinear machine, and it will generate high harmonic currents when charging the battery pack.

A harmonic current refers to a general designation of components, frequencies of which are integer multiples of the original periodic current frequency when non-periodic current function is expanded in Fourier series. The harmonic current whose frequency is equal to an integer "n" multiple of the original periodic current frequency is referred to as an nth harmonic current. A periodic signal may be decomposed into a linear superposition of a DC component a0 and sine (or cosine) signals having different frequencies by a discrete Fourier transform (DFT):

$$x(t) = a_0 + \sum_{n=1}^{\infty} A_n \cos(n\omega_0 t + \varphi_n)$$

wherein, $A_n \cos(n\omega_0 t + \phi_n)$ is the expression of the nth harmonic, and An indicates the amplitude of the nth harmonic, whose angular frequency is $n\omega_0$, and whose initial phase is $\phi^0$. When n=1, $A_1 \cos(\omega_0 t + \omega_1)$ is the expression of the fundamental frequency. $\omega_0/2\pi$ is the frequency of the fundamental component, which is called the fundamental frequency, and is equal to the frequency of the AC signal.

Figures 1A, 1B:
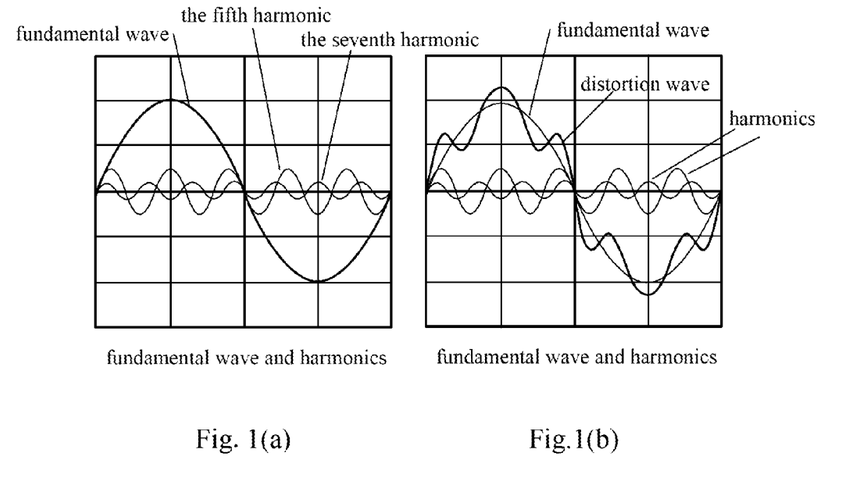
FIG. 1(a) is a graphic representation of a fundamental wave and harmonics after DFT, showing the waveform of the fundamental wave as well as the waveforms of the fifth harmonic and the seventh harmonic.
FIG. 1(b) is a waveform after harmonic distortion generated after superposition of the waves of the fundamental wave and the harmonics.

FIG. 1(a) is the graphical representation of the fundamental wave and the harmonic after DFT, where it shows the waveform of the fundamental wave and the waveforms of the 5th and 7th harmonics.

FIG. 1(b) shows the waveforms of the harmonic distortion resulting from the superposition of the waveforms of the fundamental wave and the harmonics, on the basis of the fundamental wave and the harmonics in FIG. 1(a).

The harmonic current is very harmful to the power system, and in the meantime, the harmonic current also produces serious interferences on the electronic and communication equipments outside the power system.

If the total amount of current is set as I1, the harmonic current amount is set as IH, then THD=IH/I1×100% is called a total harmonic current distortion rate, which is an important indicator for measuring the size of the harmonic current in the power system currently.

The input current THD of the existing electric vehicle charger generally reaches 2.36% to 28%, and the THD of some on-board charger even reaches 59.6%, while a large electric vehicle charging station has many such chargers working simultaneously therein. Therefore, the THD of the harmonic currents generated in the process of charging vehicle battery by the electric vehicle charging station will increase greatly, with a very serious harm to the public grid. In all the harmonics, those which have the most significant impact on the THD are the odd harmonics, for example, 3rd, 5th, 7th harmonics and etc.

SUMMARY OF THE DISCLOSURE

In order to eliminate and suppress harmonics, the present disclosure proposes a charging system, comprising: a charger configured to be coupled to an external power source with its one end; a plurality of secondary batteries configured to be coupled to the charger, respectively; and a control device configured to be coupled to the charger and the plurality of secondary batteries, to control the charger to perform a charging operation on the plurality of secondary battery.

According to the above aspect of the present disclosure, the control device comprises: a battery grouping unit configured to group the plurality of secondary batteries, so that harmonics of each group of the grouped secondary batteries may be reduced or eliminated after superposition.

According to the above aspect of the present disclosure, the control device further comprises: a coupling control unit configured to connect the secondary batteries in each group in parallel, then couple them to the charger, according to the grouping result of the battery grouping unit.

According to the above aspect of the present disclosure, each group includes two secondary batteries, and the corresponding harmonics of the two secondary batteries have identical frequencies and opposite phases.

According to the above aspect of the present disclosure, there is further comprised: a database configured to store charging history data of the plurality of secondary batteries, wherein the battery grouping unit groups the plurality of secondary batteries according to the charging history data.

According to the above aspect of the present disclosure, the control device further comprises: an information recording unit configured to record current waveform information when the charger is charging the secondary battery, and store the recorded current waveform information in the database, as the charge history data.

According to the above aspect of the present disclosure, there is further comprised: a phase adjusting unit configured to be coupled in series between the charger and the plurality of secondary batteries, wherein the battery grouping unit is further configured to calculate a phase difference between the fundamental waves of the respective secondary batteries according to the charge history data, and the phase adjusting unit is further configured to adjust, based on the phase difference, the phases of the fundamental waves of the respective secondary batteries to be identical.

According to the above aspect of the present disclosure, there is further comprised a third order filter configured to be coupled in series between the phase adjusting unit and the plurality of secondary batteries, for filtering out third harmonics from the currents.

According to the above aspect of the present disclosure, the battery grouping unit groups the plurality of secondary batteries to meet the following conditions: (1) for any battery z of the plurality of secondary batteries, extracting, from its charging history data, orders nz, amplitudes Anz and phase angle Φnz of the respective harmonics; (2) selecting a group of batteries GroupΦ meeting the following conditions from the plurality of secondary batteries: nx=nz and $\Phi_{nx}=\pi-\Phi_{nz}$, wherein x represents any battery except for the battery z of the plurality of secondary batteries; (3) sorting the amplitudes of the respective harmonics in the group of batteries GroupΦ in a descending order; (4) comparing the amplitude Anz of the nz-th harmonic of the battery z with the respective amplitudes of the group of batteries GroupΦ, respectively, to obtain a plurality of differences ΔA; and, (5) when a certain difference ΔA is smaller than a preset threshold value, grouping a battery corresponding to the difference and the battery z into the same group, or grouping a battery corresponding to the smallest one of the respective differences ΔA and the battery z into the same group.

According to another aspect of the present disclosure, the present disclosure provides a charging method, comprising: providing a charger, so that one end of the charger is coupled to an external power source; coupling a plurality of secondary batteries to the charger, respectively; and providing a control device, so that the control device controls charging operations performed by the charger on the plurality of secondary batteries.

According to the above aspect of the present disclosure, there is further comprised a battery grouping step for grouping the plurality of secondary batteries, so that harmonics of each group of the grouped secondary batteries are reduced or eliminated after superposition.

According to the above aspect of the present disclosure, the method further comprises: a coupling control step for connecting the secondary batteries in each group in parallel, then coupling them to the charger, according to the grouping result of the battery grouping step.

According to the above aspect of the present disclosure, each group includes two secondary batteries, and the corresponding harmonics of the two secondary batteries have identical frequencies and opposite phases.

According to the above aspect of the present disclosure, the method further comprises an information recording step for recording current waveform information when the charger is charging the secondary battery, and storing the recorded current waveform information in the database, as the charge history data, wherein the battery grouping step groups the plurality of secondary batteries according to the charge history data.

According to the above aspect of the present disclosure, the method further comprises a fundamental wave phase difference calculating step for calculating a phase difference between the fundamental waves of the respective secondary batteries according to the charge history data; and a phase adjusting unit for adjusting, based on the phase difference, the phases of the fundamental waves of the respective secondary batteries to be identical.

According to the above aspect of the present disclosure, the method further comprises a third harmonic filtering step for filtering out third harmonics from the currents of the plurality of secondary batteries.

According to the above aspect of the present disclosure, the battery grouping step comprises the steps of: (1) for any battery z of the plurality of secondary batteries, extracting, from its charging history data, orders nz, amplitudes Anz and phase angle Φnz of the respective harmonics; (2) selecting a group of batteries GroupΦ meeting the following conditions from the plurality of secondary batteries: nx=nz and $\Phi_{nx}=\pi-\Phi_{nz}$, wherein x represents any battery except for the battery z of the plurality of secondary batteries; (3) sorting the amplitudes of the respective harmonics in the group of batteries GroupΦ in a descending order; (4) comparing the amplitude Anz of the nz-th harmonic of the battery z with the respective amplitudes of the group of batteries GroupΦ, respectively, to obtain a plurality of differences ΔA; and (5) when a certain difference ΔA is smaller than a preset threshold value, grouping a battery corresponding to the difference and the battery z into the same group, or grouping a battery corresponding to the smallest one of the respective differences ΔA and the battery z into the same group.

According to a further aspect of the present disclosure, there is provided a charging control device coupled to a charger and a plurality of secondary batteries, comprising: a battery grouping unit configured to group the plurality of secondary batteries, so that harmonics of each group of the grouped secondary batteries are reduced or eliminated after superposition; and a coupling control unit configured to connect the secondary batteries in each group in parallel, then couple them to the charger, according to the grouping result of the battery grouping unit.

According to the above aspect of the present disclosure, each group includes two secondary batteries, and the corresponding harmonics of the two secondary batteries have identical frequencies and opposite phases.

According to the above aspect of the present disclosure, the charging control device further comprises: a phase adjusting unit configured to be coupled in series between the charger and the plurality of secondary batteries, wherein the battery grouping unit is further configured to calculate a phase difference between the fundamental waves of the respective secondary batteries, and the phase adjusting unit is further configured to adjust, based on the phase difference, the phases of the fundamental waves of the respective secondary batteries to be identical.

According to the above aspect of the present disclosure, the charging control device further comprises a third order filter configured to be coupled in series between the phase adjusting unit and the plurality of secondary batteries, for filtering out third harmonics from the currents.

According to yet another aspect of the present disclosure, there is provided a computer program product for charging a secondary battery, the computer program product comprises: a computer readable storage medium that may be read by a processing circuit and stores instructions, which are executed by the processing circuit for executing a charging method, the charging method comprises: providing a charger, so that one end of the charger is coupled to an external power source; coupling a plurality of secondary batteries to the charger, respectively; and providing a control device, so that the control device controls charging operations performed by the charger on the plurality of secondary batteries.

According to the above aspect of the present disclosure, there is further comprised a battery grouping step for grouping the plurality of secondary batteries, so that harmonics of each group of the grouped secondary batteries are reduced or eliminated after superposition.

According to the above aspect of the present disclosure, there is further comprised a coupling control step for connecting the secondary batteries in each group in parallel, then coupling them to the charger, according to the grouping result of the battery grouping step.

According to the above aspect of the present disclosure, each group includes two secondary batteries, and the corresponding harmonics of the two secondary batteries have identical frequencies and opposite phases.

According to the above aspect of the present disclosure, there is further comprised an information recording step for recording current waveform information when the charger is charging the secondary battery, and storing the recorded current waveform information in the database, as the charge history data, wherein the battery grouping step groups the plurality of secondary batteries according to the charge history data.

According to the above aspect of the present disclosure, the method further comprises a fundamental wave phase difference calculating step for calculating a phase difference between the fundamental waves of the respective secondary batteries according to the charge history data; and a phase adjusting unit for adjusting, based on the phase difference, the phases of the fundamental waves of the respective secondary batteries to be identical.

According to the above aspect of the present disclosure, there is further comprised a third harmonic filtering step for filtering out third harmonics from the currents of the plurality of secondary batteries.

According to the above aspect of the present disclosure, the battery grouping step comprises the steps of: (1) for any battery z of the plurality of secondary batteries, extracting, from its charging history data, orders nz, amplitudes Anz and phase angle Φnz of the respective harmonics; (2) selecting a group of batteries GroupΦ meeting the following conditions from the plurality of secondary batteries: nx=nz and $\Phi_{nx} = \pi - \Phi_{nz}$, wherein x represents any battery except for the battery z of the plurality of secondary batteries; (3) sorting the amplitudes of the respective harmonics in the group of batteries GroupΦ in a descending order; (4) comparing the amplitude Anz of the nz-th harmonic of the battery z with the respective amplitudes of the group of batteries GroupΦ, respectively, to obtain a plurality of differences ΔA; and, (5) when a certain difference ΔA is smaller than a preset threshold value, grouping a battery corresponding to the difference and the battery z into the same group, or grouping a battery corresponding to the smallest one of the respective differences ΔA and the battery z into the same group.

According to the charging system, charging method, charging control device and computer program product of the present disclosure, secondary batteries having harmonics with identical frequencies and opposite phases are connected in parallel for charging, the harmonic distortion generated by high order harmonics is reduced or eliminated, and the value of THD is effectively reduced.

BRIEF DESCRIPTION OF THE DRAWINGS

These and/or other aspects and advantages of the present disclosure will become more apparent and more readily understandable from the following detailed description for the embodiments of the present disclosure in contap with the drawings, in which.

DETAILED DESCRIPTION OF EMBODIMENTS

Some preferable embodiments will be described in more detail with reference to the accompanying drawings, in which the preferable embodiments of the present disclosure have been illustrated. However, the present disclosure may be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a vehiclerier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for vehiclerying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
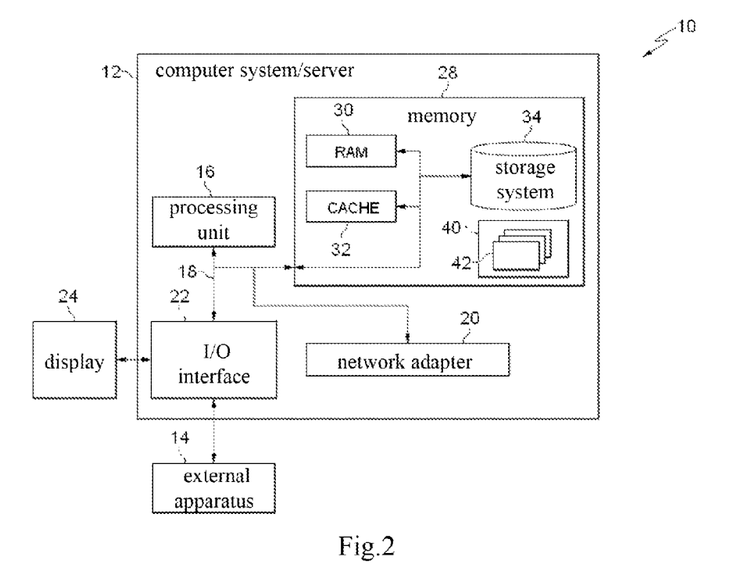
FIG. 2 is a block diagram of a general system that may be used to implement an embodiment of the present disclosure.

Referring now to FIG. 2, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 2, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown in FIG. 2 and typically called a "hard drive"). Although not shown in FIG. 2, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to vehiclery out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally vehiclery out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network vehicled, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted in FIG. 2, network adapter 20 communicates with the other components of computer system/server 12 via bus 18. It should be understood that although not shown in FIG. 2, other hardware and/or software components could be used in contap with computer system/server 12. Examples, include, but are not limited to: microcode, device drivers, redundant processing units, external disk drive arrays, RAID systems, tape drives, and data archival storage systems, etc.

Figure 3:
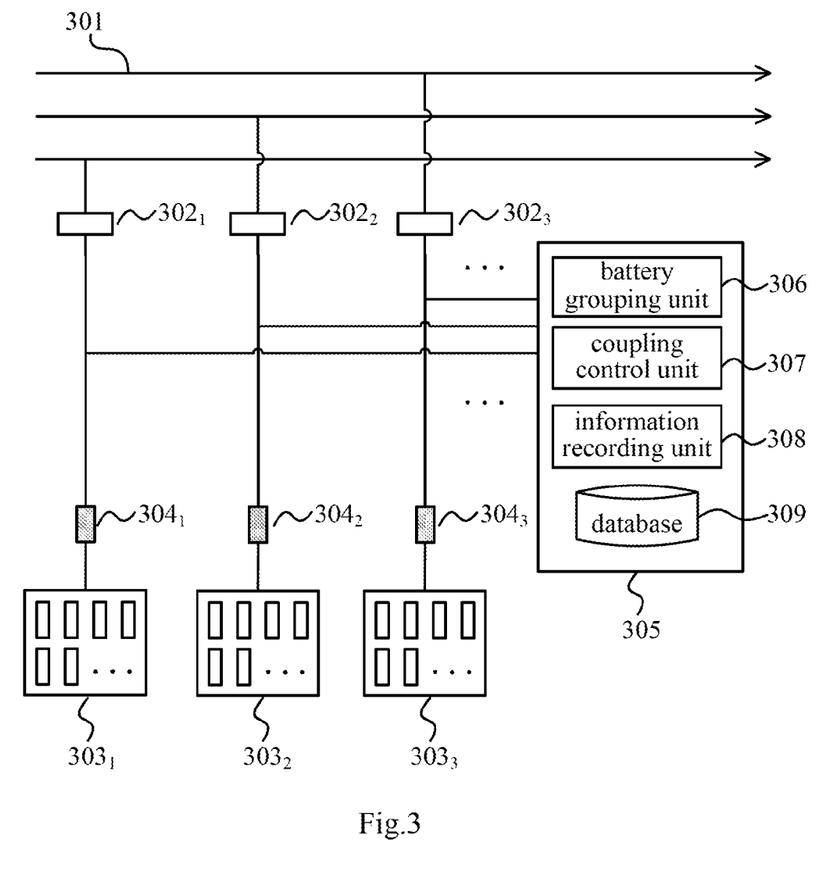
FIG. 3 shows a block diagram of a charging system for charging a battery of an electric vehicle according to an embodiment of the present disclosure.

FIG. 3 shows a block diagram of a charging system for charging a battery of an electric vehicle according to an embodiment of the present disclosure. The charging system shown in FIG. 3 is only an example and does not bring about any limitation to the functions and scope of the present disclosure.

As shown in FIG. 3, the charging system 300 may comprises: a plurality of chargers 3021, 3022, 3023, their one ends are coupled to an external power source 301 for receiving charging electric energy, the external power source 301 may be an electric power line from a public supply network, for example; a plurality of secondary secondary batteries 3031, 3032, 3033, which are coupled respectively to the above mentioned plurality of chargers 3021, 3022, 3023 through switches or taps 3041, 3042, 3043; and, a control device 305 coupled to the plurality of chargers 3021, 3022, 3023 and the plurality of secondary secondary batteries 3031, 3032, 3033 respectively for controlling the chargers 3021, 3022, 3023 to perform charging operations on a plurality of secondary batteries of the secondary secondary batteries 3031, 3032, 3033. In the following description, in case that no specific designation is made, reference signs 302, 303, 304 are used collectively to indicate the above mentioned chargers, secondary batteries and switches/taps, respectively.

The above chargers are for example various models or types of chargers that are applicable for charging the batteries of the electric vehicle and known to those skilled in the art, which does not limit the scope of the present disclosure.

The above control device 305 may be realized by means of the computer system/server 12 as shown in FIG. 2.

The battery of the electric vehicle is generally a secondary battery, which is also called as an accumulator. In an example, for example, an accumulator of which electromotive force is 2V (lead-acid battery) or 1.2V (NiMH battery) or 3.6V (lithium battery) is taken as a basic unit of a battery and is called a cell. A single battery constituted by packaging several cells is abbreviated as a battery. A battery pack is constituted by connecting in series several batteries. The batteries of the electric vehicle may be a battery pack constituted by connecting in series and stacking a plurality of batteries. As an example, a typical battery pack may have about 96 batteries. In the present disclosure, a battery pack of each electric vehicle is regarded as the whole which is called a secondary battery, and each group of batteries (set) 303 comprises a plurality of such secondary batteries.

According to an embodiment of the present disclosure, a plurality of automatic switches may be arranged among the plurality of secondary batteries of each group of batteries 303. Through a control instruction issued by the control device 305, the on/off status of these automatic switches may be changed, thus the coupling mode between the secondary batteries and between the chargers 302 are changed. For example, in response to the instruction from the control device 305, any two or more batteries in each group of batteries 303 may be implemented as a status of being coupled in parallel to be charged.

The above switches (taps) may be, for example, various switches/taps suitable to be used by the charging system of the present disclosure as known by those skilled in the art, and their specific implementations do not limit the scope of the present disclosure.

Referring to FIG. 3 continually, as shown in FIG. 3, the control device 305 may comprise a database 309 for storing basic information and charging history data of the plurality of secondary batteries. The basic information of the secondary batteries may comprise but is not limited to ID information of each secondary battery distinguished from other secondary batteries. The charging history data includes but is not limited to electric current waveform information of each secondary battery when being charged in the past, comprising fundamental wave information and harmonic information, such as the frequency, amplitude and phase angle of the fundamental wave, and the frequencies, amplitudes and phase angles of harmonics of various orders, and the like.

The database 309 may not be arranged inside the control device 305, and is arranged outside it, as long as the control device 305 may access it, i.e., read data therefrom, and may store data therein.

As shown in FIG. 3, the control device 305 may further include an information recording unit 308. When the plurality of secondary batteries 303 are coupled to the control device 305, the information recording unit 308 may read from each secondary battery the basic information of the secondary battery, and record the basic information in the database 309. When the plurality of secondary batteries 303 are coupled to the charger 302 and are charged, the control device 305 may detect the electric current waveform information of each secondary battery when the charger 302 is performing the charging, and record the detected electric current waveform information in the database 309 as the charging history data through the information recording unit 308. The charging history data may be read by a battery grouping unit 306 when being charged next time, for performing grouping processing on the secondary batteries.

As shown in FIG. 3, the control device 305 may further include a battery grouping unit 306. The battery grouping unit 306 may analyze the charging history data of the plurality of secondary batteries stored in the database 309, to group the plurality of secondary batteries so that the harmonics of the secondary batteries in each group may be reduced or eliminated after superposition. According to an example of the present disclosure, each group may have two secondary batteries, of which the frequencies of the electric current harmonics are identical and the phases of electric current harmonics are opposite.

According to an embodiment of the present disclosure, the battery grouping unit 306 operates according to the following manner (1) For any one battery z in the plurality of secondary batteries 303, extracting from its charging history data the order nz of each harmonic as well as the amplitude Anz and phase angle Φnz of the harmonic;

(2) judging whether the battery grouping unit has analyzed the battery z; if the judging result is "yes", i.e., the above battery z has been analyzed, then selecting another battery to execute the above operation (1);

(3) if the judging result is "no", i.e., the above battery z has not been analyzed, then selecting another battery x from the plurality of secondary batteries to judge whether it conforms to the following condition nx=nz, $\Phi_{nx}=\pi-\Phi_{nz}$. Selecting various batteries meeting the above condition to constitute a group of batteries GroupΦ, wherein x indicates any battery except for the battery z in the plurality of secondary batteries;

(4) ranking the amplitudes of various harmonics in the group of batteries GroupΦ in a descending order;

(5) comparing the amplitude Anz of nz harmonic of the battery z with the amplitudes in the group of batteries GroupΦ, respectively, to obtain a plurality of difference values ΔA;

(6) judging whether a difference value ΔA is smaller than a predefined threshold (or whether it is the minimum);

(7) when a difference value ΔA is smaller than the predefined threshold, i.e., the above judging result is "yes", grouping the battery corresponding to the difference value and the battery z into the same group; when the above difference value is not smaller than the predefined threshold, then returning to operation (1) to repeat the process of operations (1)-(6);

(8) judging whether the analyzing operations of all batteries have been completed; and (9) if the analyzing operations of all batteries have been completed, then terminating the process, otherwise repeating processes of operations (1)-(8).

Through the above operations, the battery grouping unit 306 may group the plurality of secondary batteries based on the charging history data of the plurality of secondary batteries stored in the database 309, so that each group may have a plurality of secondary batteries or two secondary batteries, of which some current harmonics may have identical frequencies but different phases.

As shown in FIG. 3, the control device 305 may further include a coupling control unit 307. Based on the grouping result of the battery grouping unit 306, the coupling control unit 307 controls respective switches among the plurality of switches coupled between the plurality of secondary batteries, connects the secondary batteries in each group in parallel, and couples the secondary batteries after being connected in parallel to the charger 302.

It is noted in the present disclosure, there is a waveform superposition principle about the parallel circuit, i.e., the waveforms of same harmonics (having identical frequencies) may be superimposed with each other to be enhanced, reduced or eliminated (canceled each other out). According to an embodiment of the present disclosure, after the battery grouping unit 306 finds two or more secondary batteries having harmonic electric currents with identical frequencies but opposite phases by analyzing the charging history data of the plurality of secondary batteries, by connecting the two or more secondary batteries in parallel, the same harmonic waveforms of the secondary batteries having opposite phases are superposed with each other, thereby reducing or eliminating the harmonic current of the order. According to an example of the present disclosure, if the group of secondary batteries contains two secondary batteries, when the amplitudes of the harmonics of the two secondary batteries are identical, the harmonics of the two secondary batteries may be eliminated, and when the amplitudes of the harmonics of the two secondary batteries are different, the harmonics of the two secondary batteries may be reduced.

For example, assuming a DFT transformation is performed on the signals of the secondary batteries A and B being charged, the obtained waveform formula are respectively as follows:

$$x(t) = a_0 + \sum_{n=1}^{\infty} A_n \cos(n\omega_0 t + \varphi_n),$$

and $$f(t) = a_0 + \sum_{k=1}^{\infty} B_k \cos(k\omega_0 t + \varphi_k)$$

wherein when n=k and $\Phi_n=\pi-\Phi_k$, it indicates that the same harmonics of battery A and battery B have an identical frequency and opposite phases, if further An=Bk, it indicates x(t)=-f(t), at this point, when the two batteries are connected in parallel to be charged, the same harmonics of the battery A and battery B are superposed with each other to cancel each other out.

Figure 4:
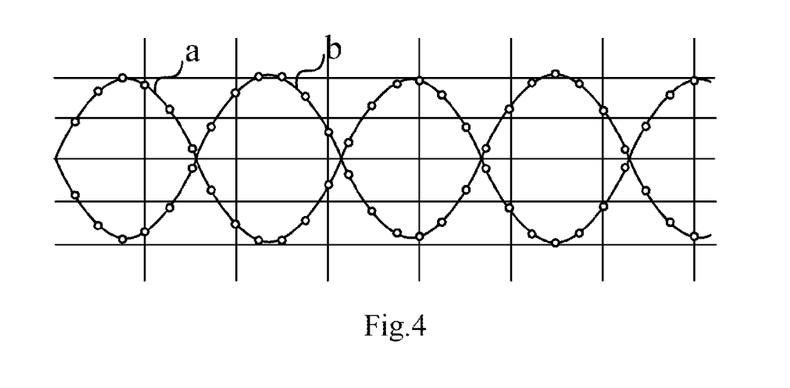
FIG. 4 shows a schematic diagram of superposed harmonic waves.

FIG. 4 shows a schematic diagram of superposed harmonic waveforms. The waveform shown in FIG. 4 is only an example, and does not limit the function and scope of the embodiments of the present disclosure.

As shown in FIG. 4, waveform "a" indicates a certain harmonic of battery A, and waveform "b" indicates the same harmonic of battery B, wherein the harmonic "a" of the battery A and the harmonic "b" of the battery B have an identical frequency, identical amplitude and opposite phases. Therefore, the harmonic "a" of the battery A and the harmonic "b" of the battery B may cancel each other out after superposing with each other.

Figure 5A:
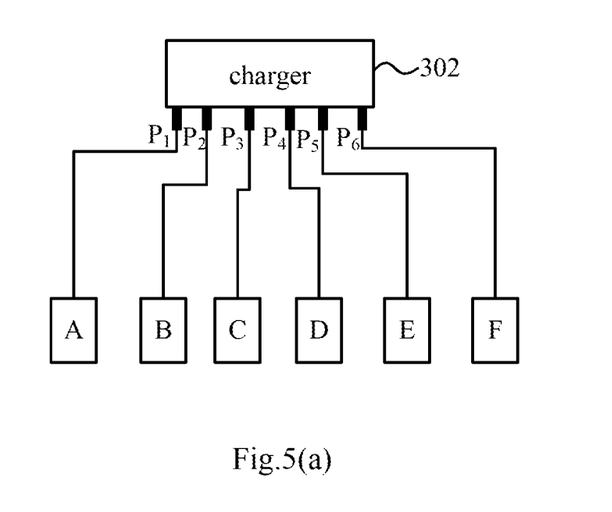
FIG. 5(a), FIG. 5(b) and FIG. 5(c) are illustrations of charging coupling of a secondary battery according to an embodiment of the present disclosure, respectively.
Figure 5B:
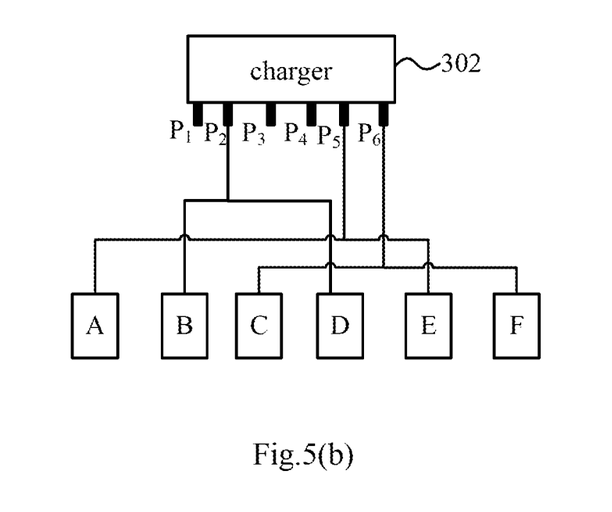
Figure 5C:
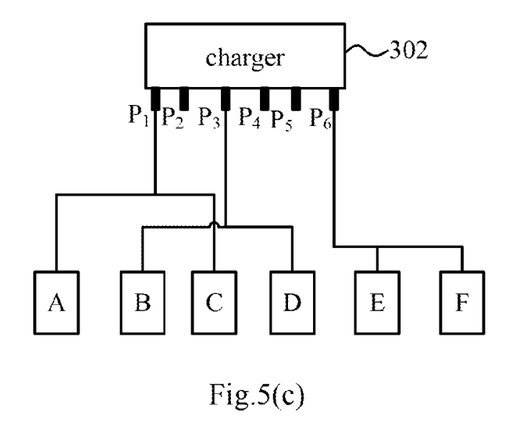

FIG. 5(*a*), FIG. 5(*b*) and FIG. 5(*c*) show an illustration of the coupling of the secondary battery for charging according to an embodiment of the present disclosure, respectively. The case of battery coupling shown in the above figures is only an example and does not bring about any limitation to the function and scope of the embodiments of the present disclosure. In which, FIG. 5(*a*) shows an illustration of an example of the coupling of the secondary battery for charging before implementing the embodiment of the present disclosure, FIG. 5(*b*) shows an illustration of an example of the coupling of the secondary battery for charging after implementing the embodiment of the present disclosure, and FIG. 5(*c*) shows an illustration of another example of the coupling of the secondary battery for charging after implementing the embodiment of the present disclosure.

As shown in FIG. 5(*a*), before implementing the embodiment of the present disclosure, for example, a plurality of secondary batteries A, B, C, D, E, F are coupled to the charger 302 via different charging interfaces P1, P2, P3, P4, P5, P6, to be charged collectively.

As shown in FIG. 5(*b*), after implementing the embodiment of the present disclosure, i.e., after grouping the above batteries and connecting the grouped batteries in parallel, the batteries connected in parallel in the plurality of secondary batteries A, B, C, D, E, F are coupled to the charger via the same charging interface to be charged collectively. Specifically, for example, in FIG. 5(*b*), a battery A and a battery E are grouped into the same group, and after being connected in parallel they are coupled to the charger 302 via the same charging interface P5; a battery B and a battery D are grouped into the same group, and after being connected in parallel they are coupled to the charger 302 via the same charging interface P2; and a battery C and a battery F are grouped into the same group, and after being connected in parallel they are coupled to the charger 302 via the same charging interface P6.

Likewise, according to another example, as shown in FIG. 5(*c*), after grouping the batteries and connecting the grouped batteries in parallel, the batteries connected in parallel in the plurality of secondary batteries A, B, C, D, E, F are coupled to the charger via the same charging interface to be charged collectively. Specifically, for example, in FIG. 5(c), a battery A and a battery C are grouped into the same group, and after being connected in parallel they are coupled to the charger 302 via the same charging interface P1; a battery B and a battery D are grouped into the group, and after being connected in parallel they are coupled to the charger 302 via the same charging interface P3; and a battery E and a battery F are grouped into the same group, and after being connected in parallel they are coupled to the charger 302 via the same charging interface P6.

The present disclosure is not limited to that each group only includes two secondary batteries. After the battery grouping unit 306 analyzes the charging history data of each secondary battery, if a certain harmonic of three or more batteries may be reduced or eliminated after superposition, the three or more secondary batteries are grouped into the same group, the three or more secondary batteries are connected in parallel, and they are coupled to the charger 302 to be charged.

In the above, an embodiment of the present disclosure is described, where by charging in parallel the secondary batteries having harmonics with identical frequency and opposite phases, the harmonic distortion generated by high order harmonics such as the fifth harmonic and the seventh harmonic etc. may be reduced or eliminated, the numerator in THD=IH/I1×100% may be reduced, and thus the value of THD may be reduced effectively.

Figure 6:
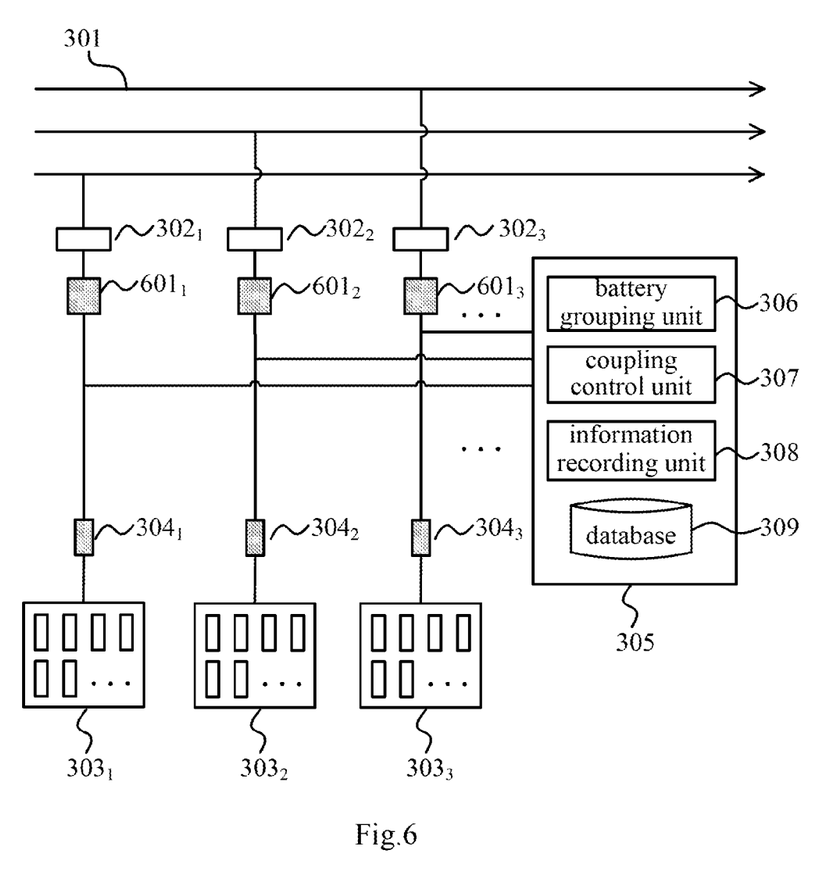
FIG. 6 shows a block diagram of a charging system for charging a battery of an electric vehicle according to another embodiment of the present disclosure.

FIG. 6 shows a block diagram of a charging system for charging a battery of an electric vehicle according to another embodiment of the present disclosure. The charging system shown in FIG. 6 is only an example, and does not bring about any limitation to the function and scope of the embodiment of the present disclosure.

The structure of the charging system 600 shown in FIG. 6 is substantial identical to the structure of the charging system 300 shown in FIG. 3, where the same reference signs indicates the identical components or units. The charging system 600 is different from the charging system 300 in that, as shown in FIG. 6, the charging system 600 further includes phase adjusters 6011, 6012, 6013. The phase adjuster 601 is coupled in series between the charger 302 and the plurality of secondary batteries 303, for adjusting the phase of the electric current waveform.

According to an embodiment of the present disclosure, when the charger 302 is charging the plurality of secondary batteries 303, the battery grouping unit 306 may analyze the charging history data corresponding to these secondary batteries 303 in the database 309, to calculate the phase difference of the fundamental waves of respective secondary batteries. The above mentioned phase adjuster 601 adjusts the phase of the fundamental wave of each secondary battery based on the calculated phase difference, so that the phases of the secondary batteries are identical.

Figure 7:
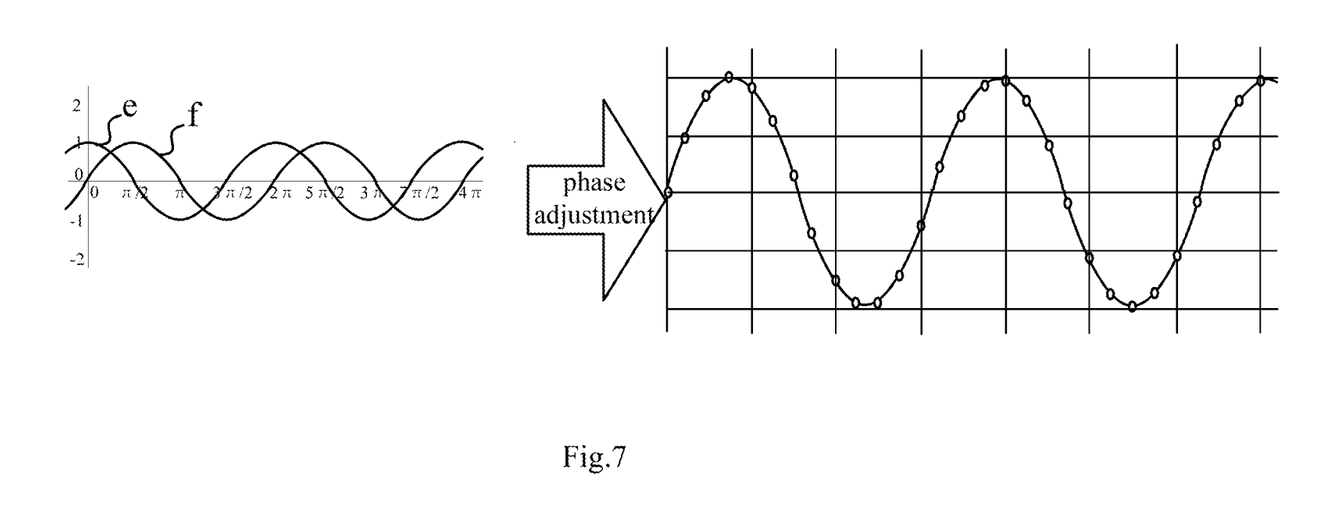
FIG. 7 shows a schematic diagram of fundamental waves before phase adjustment and after phase adjustment.

FIG. 7 shows a schematic diagram of waveforms of a fundamental wave before phase adjustment and after phase adjustment. The waveforms of the fundamental wave shown in FIG. 7 are only examples and do not bring about any limitation to the function and scope of the embodiment of the present disclosure.

As shown in FIG. 7, a waveform "e" indicates a fundamental wave of the battery E, a waveform "f" indicates a fundamental wave of the battery F, and they have identical frequency, equal amplitude and a phase difference of π/2. According to an embodiment of the present disclosure, by increasing the phase angle of the fundamental wave "e" of the battery E by π/2, the fundamental wave "e" of the battery E is made to superpose on the fundamental wave "f" of the battery F, thus it is capable of increasing the total amplitude of the fundamental waves.

In the above, another embodiment of the present disclosure is described, where by adjusting phases of electric current waveforms having identical fundamental wave frequency, the waveforms of the fundamental waves may be enhanced, i.e., the denominator in THD=IH/I1×100% may be made large, and thus the value of THD may be reduced effectively.

Figure 8:
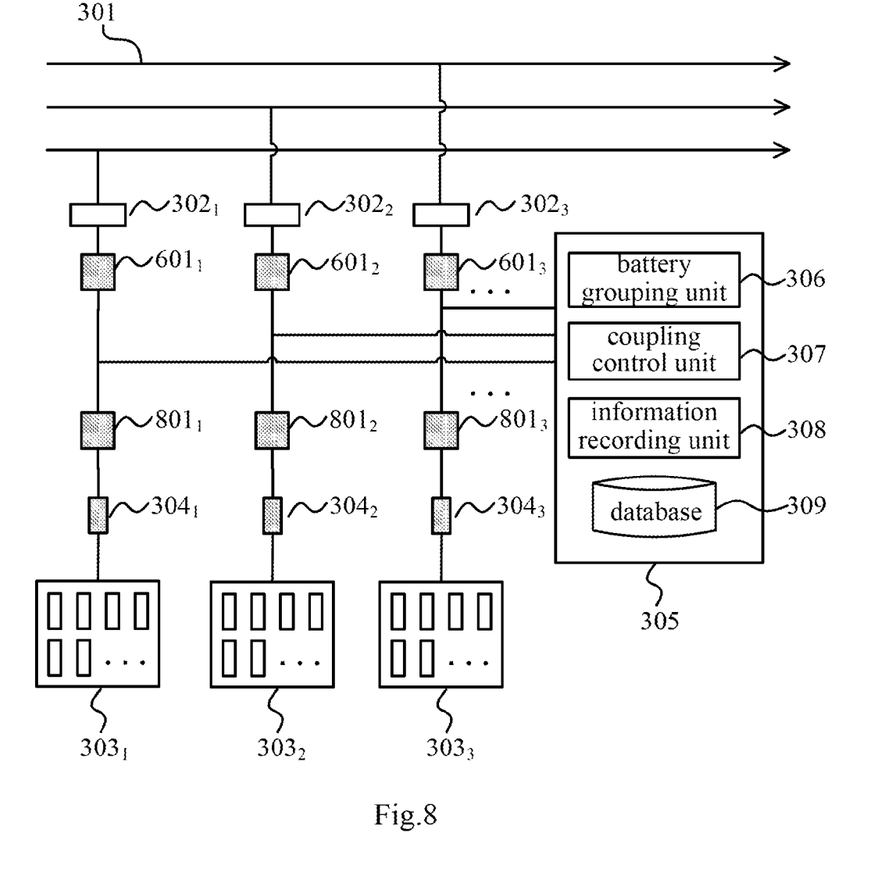
FIG. 8 shows a block diagram of a charging system for charging a battery of an electric vehicle according to still another embodiment of the present disclosure.

FIG. 8 shows a block diagram of a charging system for charging a battery of an electric vehicle according to still another embodiment of the present disclosure. The charging system shown in FIG. 8 is only an example, and does not bring about any limitation to the function and scope of the embodiment of the present disclosure.

The structure of the charging system 800 shown in FIG. 8 is substantial identical to the structure of the charging system 600 shown in FIG. 6, where the same reference signs indicate the identical components or units. The charging system 800 is different from the charging system 600 in that, as shown in FIG. 8, the charging system 800 further includes third harmonic filters 8011, 8012, 8013. The third harmonic filter 801 is coupled in series between the phase adjuster 601 and the plurality of secondary batteries 303, to filter out third harmonics in the electric current waveforms when the plurality of secondary batteries are charged. Thus the value of THD may be further reduced.

In the above, still another embodiment of the present disclosure is described, where by adding third harmonic filters, the influence of the third harmonics in the electric current waveform may be reduced, thus the value of THD is effectively reduced.

Figure 9:
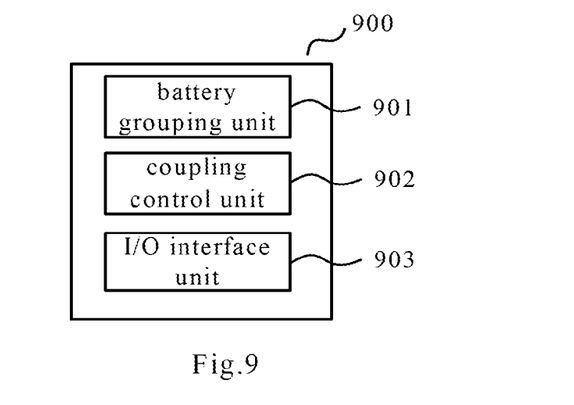
FIG. 9 shows a block diagram of a charging control device for controlling to charge a battery of an electric vehicle according to an embodiment of the present disclosure.

FIG. 9 shows a block diagram of a charging control device for controlling the charging of a battery of an electric vehicle according to an embodiment of the present disclosure. The structure of the charging control device according to the present disclosure may have the same structure as the control device 305 in the charging system 300, charging system 600 and charging system 800 as shown in FIG. 3, FIG. 6 and FIG. 8 respectively, and it may also have another structure. The charging control device 900 shown in FIG. 9 is only an example, and does not bring about any limitation to the function and scope of the embodiment of the present disclosure.

As shown in FIG. 9, the charging control device 900 may include an input/output interface unit 903, through which it is coupled to an external charger and a plurality of secondary batteries. The charging control device 900 may further include: a battery grouping unit 901 configured to group a plurality of secondary batteries so that the harmonics of the secondary batteries in each group may be reduced or eliminated after superposition; and a coupling control unit 902 configured to be coupled to an external charger 302 after the secondary batteries in each group are connected in parallel, based on the grouping result of the battery grouping unit 901.

According to a specific example of the present disclosure, each group of secondary batteries includes two secondary batteries, the corresponding harmonics of which have identical frequency and opposite phases.

According to a specific example of the present disclosure, the charging control device 900 further includes a phase adjusting unit coupled in series between an external charger and the plurality of secondary batteries (this may be achieved by coupling in series the charging control device 900 between the external charger and the plurality of secondary batteries). The battery grouping unit 901 calculates a phase difference between the fundamental waves of the respective secondary batteries, and the phase adjusting unit adjusts, based on the calculated phase difference, the phases of the fundamental waves of the respective secondary batteries to be identical. In addition, the phase adjusting unit may also be configured to locate outside the charging control device 900.

According to a specific example of the present disclosure, the charging control device 900 may further include a third harmonic filter configured to be coupled in series between the above mentioned phase adjusting unit and the plurality of secondary batteries (this may be achieved by coupling in series the charging control device 900 between the phase adjusting unit and the plurality of secondary batteries), for filtering out third harmonics from the currents.

The control device 305 and the charging control device 900 of the present disclosure may be achieved by a computer system/server 10 shown in FIG. 2. For example, a processing unit 16 executes an application for performing the steps of the method of the present disclosure stored in a storage system 34 by using an RAM 30 and a cache 32 in a memory 28 to implement the functions of the control device 305 and the charging control device 900 of the present disclosure.

Figure 10:
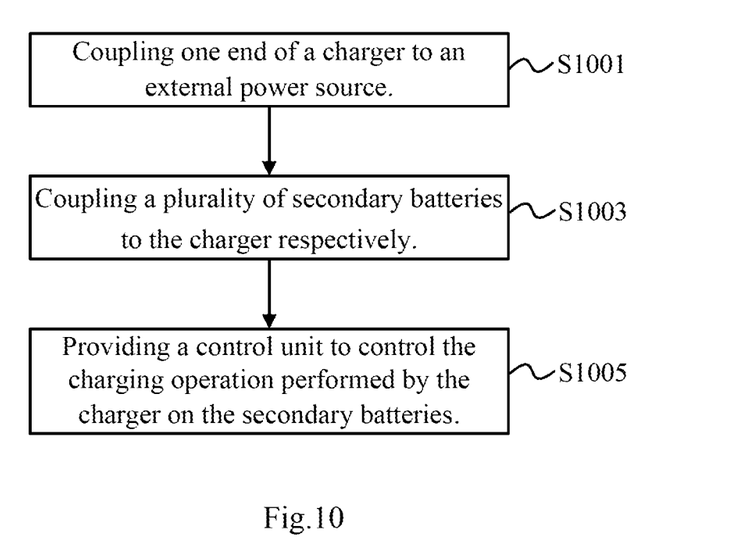
FIG. 10 shows a flowchart of a method of charging a battery of an electric vehicle according to an embodiment of the present disclosure.

FIG. 10 shows a flowchart of a method of charging a battery of an electric vehicle according to an embodiment of the present disclosure. The charging method shown in FIG. 10 is only an example, and does not bring about any limitation to the function and scope of the embodiment of the present disclosure.

As shown in FIG. 10, a charging method according to an embodiment of the present disclosure includes the following steps. In step S1001, there is provided a charger so that one end of the charger is coupled to an external power source. In step S1003, a plurality of secondary batteries are coupled to the charger, respectively. In step S1005, there is provided a control device so that the control device controls the charging operation of the charger for the plurality of secondary batteries.

Figure 11:
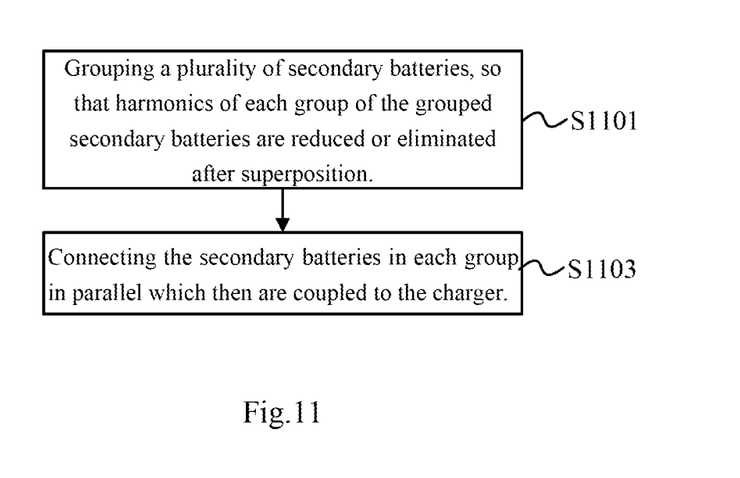
FIG. 11 shows a flowchart of a method of a control operation conducted when charging a plurality of secondary batteries according to an embodiment of the present disclosure.

FIG. 11 shows a more detailed flowchart of a method of control operation (step S1005) conducted when a plurality of secondary batteries are charged according to an embodiment of the present disclosure.

As shown in FIG. 11, a method for controlling the charging according to an embodiment of the present disclosure includes the following steps. In step S1101, a plurality of secondary batteries are grouped, so that the harmonics of the secondary batteries in each group may be reduced or eliminated after superposition. According to an example of the present disclosure, each group of secondary batteries includes two secondary batteries, the corresponding harmonics of which have identical frequency and opposite phases. In step S1103, the two secondary batteries in each group are coupled to the charger after being connected in parallel, based on the result of the battery grouping.

According to another embodiment of the present disclosure, the method for controlling the charging further includes the following steps: recording current waveform information when the charger is charging the secondary battery, and storing the recorded current waveform information in the database, as the charge history data. The battery grouping is conducted according to the charge history data.

According to another embodiment of the present disclosure, the method for controlling the charging further includes the following steps: calculating a phase difference between the fundamental waves of the respective secondary batteries according to the charge history data; and adjusting, based on the phase difference, the phases of the fundamental waves of the respective secondary batteries to be identical.

According to another embodiment of the present disclosure, the method for controlling the charging further includes the following step: filtering out third harmonics from the currents of the plurality of secondary batteries.

Figure 12:
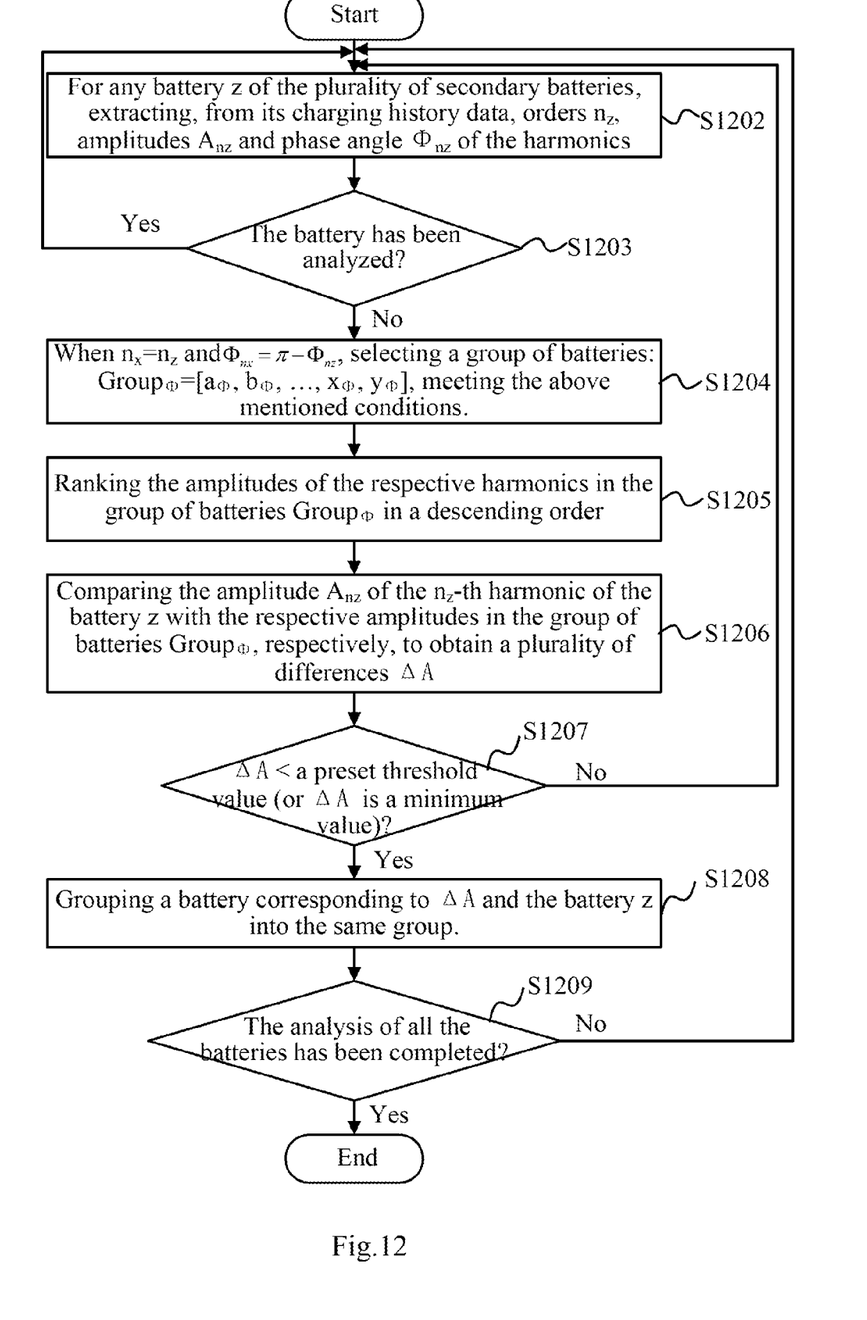
FIG. 12 shows a flowchart of a method of grouping a plurality of secondary batteries according to an embodiment of the present disclosure.

FIG. 12 shows a more detailed flowchart of a method of grouping a plurality of secondary batteries (step S1101) according to an embodiment of the present disclosure.

As shown in FIG. 12, a method of grouping a plurality of secondary batteries according to an embodiment of the present disclosure includes the following steps. In step S1202, order nz, amplitude Anz and phase angle $\Phi$nz of any battery z are extracted from the charge history data of the plurality of secondary batteries.

In step S1203, it is judged whether the battery grouping unit has analyzed the battery z. If the judging result is that the above mentioned battery z has been analyzed, i.e., the judging result is "yes", then another battery is selected, and the step S1202 is executed again. If the judging result is "no", i.e., the battery z has not been analyzed, then the process proceeds to step S1204.

In step S1204, another battery x except for battery z is selected from the plurality of secondary batteries, and it is judged whether the battery x meets the following conditions: nx=nz, and $\Phi_{nx}=\pi-\Phi_{nz}$. The batteries meeting the above conditions constitute a group of batteries Group$\Phi$, such as [a$\Phi$, b$\Phi$, . . . , e$\Phi$, f$\Phi$], wherein a$\Phi$, b$\Phi$, . . . , e$\Phi$, f$\Phi$ represent secondary batteries A, B, . . . , E, F, respectively.

In step S1205, the amplitudes of the harmonics in the group of Group$\Phi$ are ranked in a descending order.

In step S1206, the amplitude Anz of the nz-th harmonic of the battery z is compared with the respective amplitudes in the group of batteries Group$\Phi$, respectively, to obtain a plurality of differences $\Delta$A.

In step S1207, it is judged whether a difference $\Delta$A is smaller than a predefined threshold value (or whether it is the minimum).

When a difference value $\Delta$A is smaller than the predefined threshold, i.e., the above judging result is "yes", the process proceeds to step S1208. In step S1208, the battery corresponding to the difference value and the battery z are grouped into the same group, or the battery corresponding to the minimum difference value in the difference values $\Delta$A and the battery z are grouped into the same group.

When a difference value $\Delta$A is not smaller than the predefined threshold, the process returns to step 1202, to repeat the processes of steps S1202 to S1206.

In the step S1209, it is judged whether the analyzing operations of all batteries have been completed. If the analyzing operations of all batteries have been completed, then the processes are terminated, otherwise processes of the steps (1)-(8) are repeated.

In the above, various embodiments of the present disclosure has been described. By using the charging system, charging method, charging control device, and computer program product of the present disclosure, the secondary batteries having harmonics with identical frequency and opposite phases are connected in parallel to be charged, the harmonic distortion generated by high order harmonics may be reduced or eliminated, so that the numerator in THD=IH/I1×100% is reduced and the denominator is increased, thus the value of THD is effectively reduced.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A charging system, comprising:
   a charger configured to be coupled to an external power source with its one end;
   a plurality of secondary batteries configured to be coupled to the charger, respectively;
   a control device configured to be coupled to the charger and the plurality of secondary batteries to control the charger to perform a charging operation on the plurality of secondary battery; and
   a battery grouping unit configured to group the plurality of secondary batteries, so that harmonics of each group of the grouped secondary batteries are reduced or eliminated after superposition.

2. The charging system according to claim 1, the control device further comprises:
   a coupling control unit configured to connect the secondary batteries in each group in parallel, then couple them to the charger, according to the grouping result of the battery grouping unit.

3. The charging system according to claim 2, wherein each group includes two secondary batteries, and the corresponding harmonics of the two secondary batteries have identical frequencies and opposite phases.

4. The charging system according to claim 1, further comprising:
   a database configured to store charging history data of the plurality of secondary batteries, wherein the battery grouping unit groups the plurality of secondary batteries according to the charging history data.

5. The charging system according to claim 4, the control device further comprises: an information recording unit configured to record current waveform information when the charger is charging the secondary battery, and store the recorded current waveform information in the database, as the charge history data.

6. The charging system according to claim 4, further comprising:
   a phase adjusting unit configured to be coupled in series between the charger and the plurality of secondary batteries, wherein the battery grouping unit is further configured to calculate a phase difference between the fundamental waves of the respective secondary batteries according to the charge history data, and the phase adjusting unit is further configured to adjust, based on the phase difference, the phases of the fundamental waves of the respective secondary batteries to be identical.

7. The charging system according to claim 6, further comprising a third order filter configured to be coupled in series between the phase adjusting unit and the plurality of secondary batteries, for filtering out the third harmonics from the currents.

8. The charging system according to claim 2, wherein the battery grouping unit groups the plurality of secondary batteries to meet the following conditions:
   (1) for any battery z of the plurality of secondary batteries, extracting, from its charging history data, orders nz, amplitudes Anz and phase angle $\Phi$nz of the respective harmonics;
   (2) selecting a group of batteries Group$\Phi$ meeting the following conditions from the plurality of secondary batteries: nx=nz and $\Phi_{nx}=\pi-\Phi_{nz}$, wherein x represents any battery except for the battery z of the plurality of secondary batteries;
   (3) sorting the amplitudes of the respective harmonics in the group of batteries Group$\Phi$ in a descending order;
   (4) comparing the amplitude Anz of the nz-th harmonic of the battery z with the respective amplitudes of the group of batteries Group$\Phi$, respectively, to obtain a plurality of differences $\Delta A$; and,
   (5) when a certain difference $\Delta A$ is smaller than a preset threshold value, grouping a battery corresponding to the difference and the battery z into the same group, or grouping a battery corresponding to the smallest one of the respective differences $\Delta A$ and the battery z into the same group.

9. A charging method, comprising:
   providing a charger to couple one end of the charger to an external power source;
   coupling a plurality of secondary batteries to the charger, respectively;
   providing a control device which controls charging operations performed by the charger on the plurality of secondary batteries; and
   a battery grouping step for grouping the plurality of secondary batteries, so that harmonics of each group of the grouped secondary batteries are reduced or eliminated after superposition.

10. The charging method according to claim 9, further comprising:
    a coupling control step for connecting the secondary batteries in each group in parallel, then coupling them to the charger according to the grouping result of the battery grouping step.

11. The charging method according to claim 10, wherein each group includes two secondary batteries, and the corresponding harmonics of the two secondary batteries have identical frequencies and opposite phases.

12. The charging method according to claim 9, further comprising:
an information recording step for recording current waveform information when the charger is charging the secondary battery, and
storing the recorded current waveform information in the database, as the charge history data, wherein the battery grouping step groups the plurality of secondary batteries according to the charge history data.

13. The charging method according to claim 12, further comprising:
a fundamental wave phase difference calculating step for calculating a phase difference between the fundamental waves of the respective secondary batteries according to the charge history data; and
a phase adjusting unit for adjusting, based on the phase difference, the phases of the fundamental waves of the respective secondary batteries to be identical.

14. The charging method according to claim 11, further comprising:
a third harmonic filtering step for filtering out the third harmonics from the currents of the plurality of secondary batteries.

15. The charging method according to claim 9, wherein the battery grouping step comprises the steps of:
(1) for any battery z of the plurality of secondary batteries, extracting, from its charging history data, orders nz, amplitudes Anz and phase angle Φnz of the respective harmonics;
(2) selecting a group of batteries GroupΦ meeting the following conditions from the plurality of secondary batteries: nx=nz and $\Phi_{nx}=\pi-\Phi_{nz}$, wherein x represents any battery except for the battery z of the plurality of secondary batteries;
(3) sorting the amplitudes of the respective harmonics in the group of batteries GroupΦ in a descending order;
(4) comparing the amplitude Anz of the nz-th harmonic of the battery z with the respective amplitudes of the group of batteries GroupΦ, respectively, to obtain a plurality of differences ΔA; and,
(5) when a certain difference ΔA is smaller than a preset threshold value, grouping a battery corresponding to the difference and the battery z into the same group, or grouping a battery corresponding to the smallest one of the respective differences ΔA and the battery z into the same group.

16. A charging control device configured to be coupled to a charger and a plurality of secondary batteries, comprising:
a battery grouping unit configured to group the plurality of secondary batteries, so that harmonics of each group of the grouped secondary batteries are reduced or eliminated after superposition; and
a coupling control unit configured to connect the secondary batteries in each group in parallel, then couple them to the charger, according to the grouping result of the battery grouping unit.

17. The charging control device according to claim 16, wherein each group includes two secondary batteries, and the corresponding harmonics of the two secondary batteries have identical frequencies and opposite phases.

18. The charging control device according to claim 16, further comprising:
a phase adjusting unit configured to be coupled in series between the charger and the plurality of secondary batteries, wherein the battery grouping unit is further configured to calculate a phase difference between the fundamental waves of the respective secondary batteries, and the phase adjusting unit is further configured to adjust, based on the phase difference, the phases of the fundamental waves of the respective secondary batteries to be identical.

\* \* \* \* \*